Feb. 18, 1947.    N. A. HASSLER    2,415,880
ELECTRICAL SYSTEM FOR USE WITH RECORDING METERS
Filed July 31, 1944
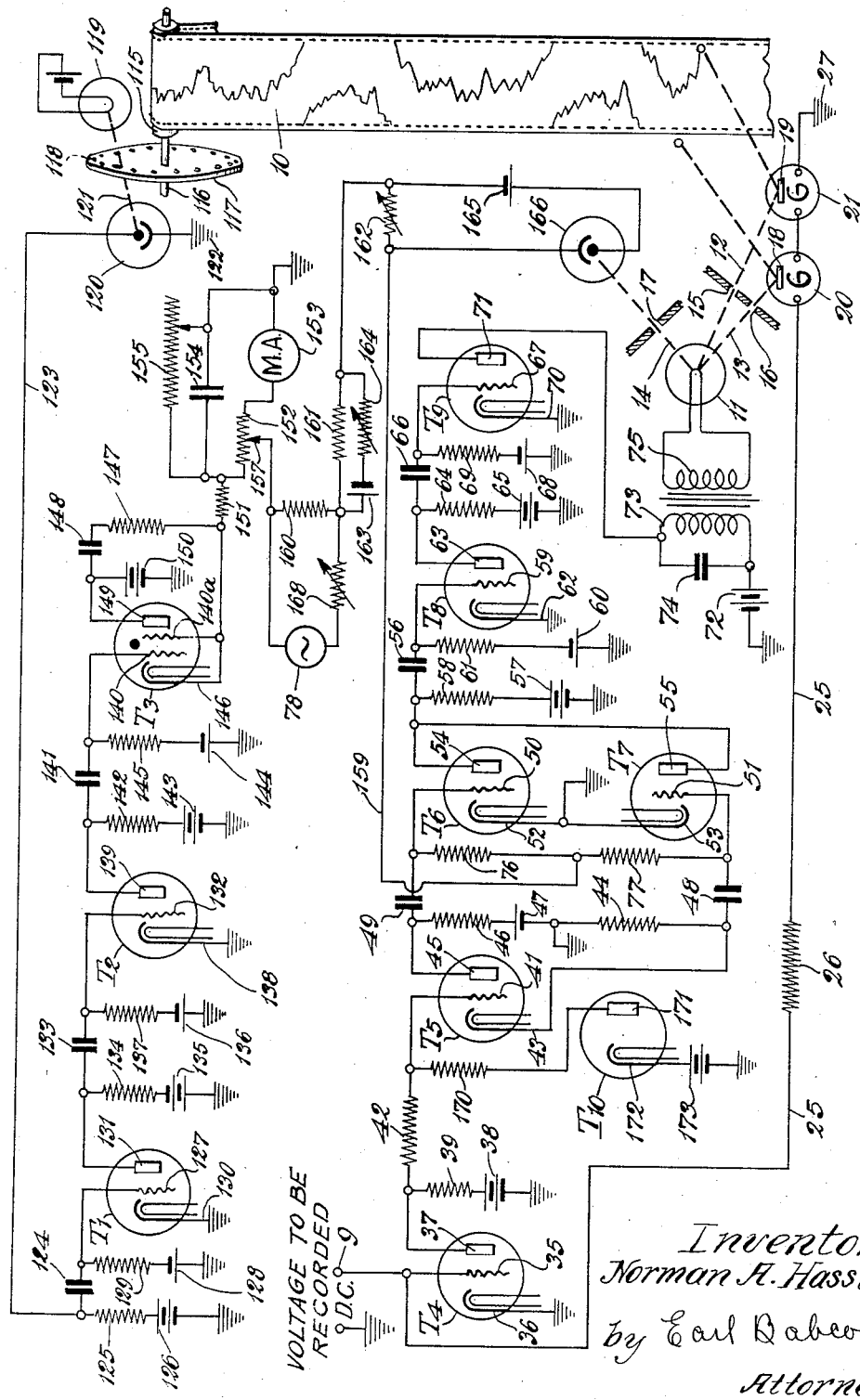

Patented Feb. 18, 1947

2,415,880

UNITED STATES PATENT OFFICE 2,415,880

ELECTRICAL SYSTEM FOR USE WITH RECORDING METERS

Norman A. Hassler, Duncan, Okla., assignor to Halliburton Oil Well Cementing Company, Duncan, Okla.

Application July 31, 1944, Serial No. 547,487

11 Claims. (Cl. 234—1.5)

This invention relates to electrical systems for use with recording meters and more particularly to electrical amplifying systems for use with recording meters of the type in which a film or tape is used to make a record of movement of a light beam reflected from the mirror of a galvanometer or similar instrument.

Subject matter shown but not claimed herein is claimed in the copending application of Norman A. Hassler, Serial No. 547,486 for Electrical systems for use in photorecording, filed on July 31, 1944.

As is well known to those skilled in the art, a source of light is commonly used to project a beam of light upon a mirror attached to the movable element of the galvanometer. The light is reflected from the mirror onto a photosensitive film or tape, so that a continuous record can be obtained of electrical values impressed upon the galvanometer. For example, in the electrical logging of oil wells a photosensitive film is geared to an electrode unit which is lowered into the well. In response to variations of electrical properties of the earth in the vicinity of the electrode unit, the electrical values are indicated by one or more galvanometers and these are recorded on film by the use of optical systems.

In connection with such recording systems difficulties are encountered in making a clear and legible record because of variations in the speed of the film and because of variations in the rate of rotation of the mirrors on the galvanometers. The speed of the electrode in the well cannot be kept uniform and hence the film in the recorder has to be moved at varying speeds. Similarly the mirror on the galvanometer moves very rapidly when a sharp increase or decrease in the electrical values in its circuit occur, while at other times it moves very slowly when changes in the electrical values are small.

The clarity and legibility of a line or trace caused by a light beam on a film being dependent on the amount of exposure, it is obvious that good results cannot be obtained if the film is moved at varying speeds or if the mirror on the galvanometer moves at varying speeds, unless some means is provided to compensate for the resultant variations in exposure of the film.

To obviate these difficulties, it is an object of the present invention to devise electrical means for controlling the intensity of the light emitted by an incandescent electrical lamp in proportion to the speed of relative movement between a film and a beam of light originating in the lamp and projected upon the film, especially where the speed of relative movement between the film and the beam of light is dependent on more than one variable.

It is a further object of the invention to devise an electric control system for causing a lamp to emit light in proportion to the rate of change in voltage supplied to a galvanometer used in conjunction with the lamp for photographic recording. The voltage of a galvanometer circuit controls the extent of deflection of the movable element thereof, but the rate of change in voltage (or the first differential of the voltage) is the factor which controls the speed of the motion of the movable element thereof. Therefore, if the intensity of light given off by a lamp is made proportional to the rate of change in voltage in a galvanometer circuit, the amount of light given off will be approximately proportional to the speed of movement of a mirror on the movable element of the galvanometer, and if the light beam projected on a film from the mirror has its origin in a lamp so controlled, a uniform exposure of the film can be obtained. The faster the mirror moves, the more intense is the light directed onto the film.

It is a further object of the invention to devise an electrical system in which an incandescent electrical lamp is used in conjunction with a photographic recording film and in which the intensity of the light emitted by the lamp is so varied as to cause it to be approximately proportional to two factors, the rate of change in voltage applied to a galvanometer and the speed of the photographic film, so that the amount of exposure of one unit area of the film will be approximately the same as the others, thus compensating for the variations in relative velocity of movement between a spot of light from the lamp and the film. If a film is moving longitudinally with respect to a galvanometer which causes a beam of light to move laterally across the film, the relative motion between the spot of light and the film is, of course, the vector sum of the two motions. To make a perfect record or trace on the film by varying the intensity of light given off by a lamp in accordance with these two motions, the amount of light should be made to vary in accordance with this vector sum, but sufficiently accurate results can be obtained for practical purposes if the amount of light emitted by the lamp is made to vary in proportion to the algebraic rather than the vector sum of the two motions.

It is still a further object of the invention to devise an electrical control system for a lamp used to project light onto two galvanometers connected to the same variable source and alternately projecting a beam of light onto the same film, especially where the galvanometers have different sensitivity so that the mirrors thereof move at different speeds, the electrical system automatically compensating for the difference in sensitivity to cause the records or traces on the film to be uniformly clear and legible.

Other objects and advantages reside in certain novel features of the arrangement and construction of parts as will be apparent from the following description taken in connection with the accompanying drawing in which:

The single figure is a diagrammatic representation of an electrical system in which the principles of the present invention are incorporated.

Referring to the drawing in detail, it will be seen that a direct current source of electricity is indicated at 9, the voltage variations of which are to be recorded on a photographic film shown at 10. The film is mounted for movement with respect to an incandescent electrical lamp 11 which emits light represented by the dash lines 12, 13 and 14, the beams passing through apertures illustrated at 15, 16 and 17. The beams of light 12 and 13 which pass through the apertures 15 and 16 strike mirrors 18 and 19 on galvanometers 20 and 21, and are reflected by the mirrors in the general direction of the film 10. Movement of the beam of light is thus a function of the voltage of the source 9.

The galvanometer 21 may be referred to as an "on scale" galvanometer while the galvanometer 20 may be referred to as an "off scale" galvanometer. These terms are now commonly used in the electrical well logging art to designate galvanometers which are used to make traces on the film alternately, i. e., when one galvanometer is projecting its beam onto the film, the beam from the other is off the film and vice versa. The galvanometers are connected in series as illustrated. As long as the voltage supplied to them is below a predetermined value, only the "on scale" galvanometer 21 projects a beam of light onto the film to make an "on scale" trace or log. When the voltage is so large that the beam of light 12 moves off the film (to the right as viewed in the drawing) the "off scale" galvanometer 20 then projects its beam of light onto the film (starting at the left side of the film as viewed in the drawing) to make what is called an "off scale" trace or log during the time that the beam of light from the galvanometer 21 is off the film.

The galvanometers 20 and 21 are so designed as to have different sensitivity. It is preferable to have the characteristics of the galvanometer 20 such that each unit of deflection of its beam of light 13 upon a film represents say ten times the change in voltage required to cause the beam of light 12 reflected by the mirror 19 of the galvanometer 21 to move the same unit distance across the film. In other words, the scale for the galvanometer 20 may represent tens while the scale for the galvanometer 21 represents units of quantities of voltage applied to the galvanometers.

As shown in the drawing, one terminal of the source 9 is grounded while the other is connected by the wire 25 to the galvanometer 20, the wire 25 containing a resistance 26. One terminal of the galvanometer 21 is connected to the galvanometer 20 and the other terminal is grounded as shown at 27. Thus the galvanometers are connected in series and they are connected directly to the source 9.

As indicated above, the present invention relates to a system for controlling the intensity of the light emitted by the lamp 11, to overcome the effects of two variables. One of these is the speed of the deflection of the galvanometers 20 and 21 which is proportional to the rate of change in voltage of the source 9. The other variable is that caused by different speeds of the film 10. The arrangement for varying the intensity of the light emitted by the lamp 11 in proportion to the changes of voltage in the source 9 will first be described.

An amplifying system or network consisting of a number of resistance coupled thermionic tubes is provided for supplying current to the primary of a transformer, the secondary of which is connected to the lamp 11. The tubes in this network, as well as the others shown in the drawing are of the type in which the cathodes are indirectly heated. To simplify the drawing the circuits to the filaments are not included.

The tube $T_4$ functions as a direct current amplifier. Its grid 35 is connected to one terminal of the source 9, while its cathode 36 is grounded. The plate 37 is supplied by "B" battery 38 through a resistance 39. The plate 37 is connected to the grid 41 of the tube $T_5$ through a resistance 42.

The tube $T_5$ is so connected as to constitute what is called an inverter. It deals only with changes in D. C. voltage. The cathode 43 of this tube is connected through resistance 44 to ground, while the plate 45 is connected through resistance 46 to "B" battery 47 which is grounded. For any given change in voltage on grid 41, the change in potential between the outside terminal of resistance 46 and ground is 180 degrees out of phase from the change in potential between the outside terminal of resistance 44 and ground.

Condensers 48 and 49 being in the output circuit of tube $T_5$, no direct current is transmitted to the succeeding stages of the amplifying system from the tube $T_5$. The tube $T_5$ is connected to the tubes $T_6$ and $T_7$, through a differentiating network, which includes the condensers 48 and 49. The plate 45 is connected through condenser 49 to the grid 50 of tube $T_6$ while the cathode 43 of the tube $T_5$ is connected through the condenser 48 to the grid 51 of the tube $T_7$ of this network. In addition the network includes two resistances 76 and 77 connected in series across the grids 50 and 51 and at the midpoint between these resistances an alternating current potential is applied from the source 78, as will be described hereinafter. A voltage proportional to the rate of change in voltage of the source 9 is supplied to the grids 50 and 51 of the tubes $T_6$ and $T_7$ by the differentiating network which consists of condensers 48 and 49 and the resistances 76 and 77.

The cathodes 52 and 53 of the tubes $T_6$ and $T_7$ are connected to each other and the plates 54 and 55 of these tubes are connected to each other. The plates 54 and 55 are supplied by "B" battery 57 through a resistance 58. The output of tubes $T_6$ and $T_7$ connected to the differentiating network is an amplified alternating current voltage which is applied to the condenser 56. The connections between the inverter $T_5$ and the differentiating network are such that the voltages applied to the grids 50 and 51 of tubes $T_6$ and $T_7$ are effective to cause only one of these tubes to amplify for any given change in the input voltage to tube $T_5$. Whenever there is an increase in the voltage of the source 9, a potential is applied to the grid 50 of tube $T_6$ which causes it to function and amplify. Whenever there is a decrease in the voltage of source 9 a potential is applied to the grid 51 controlling the tube $T_7$ which causes it to function and amplify. Thus, whether there is an increase or a decrease in the voltage of the source 9, there is an increase in the output of the differentiating network and the magnitude of the energy in the output is proportional to the rate of change in voltage of the source 9, regardless of the direction of change. Such a condition is required in order to vary the intensity of light emitted from lamp 11 when the mirrors of the galvanometers are moving toward the zero position thereof as well as when they are moving away from that position.

The condenser 56 referred to above is connected to the grid 59 of the tube $T_8$. A small battery 60 connected to the grid 59 through a resistance 61 puts a negative bias on grid 59. The cathode 62 of the tube $T_8$ is grounded while the plate 63 is connected through resistance 64 to "B" battery 65. The plate 61 is also connected through condenser 66 to the grid 67 of tube $T_9$. A small battery 68 connected to the grid 67 through a resistance 69 puts a negative bias thereon. The cathode 70 of the tube $T_9$ is grounded while the plate 71 thereof is connected to a "B" battery 72 through the primary 73 of the transformer across which condenser 74 is connected. The secondary 75 of the transformer is connected to the filament of the lamp 11.

Thus the tubes $T_8$ and $T_9$ function as an ordinary resistance coupled alternating current amplifying system, the input of which is supplied through the tubes $T_6$ and $T_7$ controlled by the rate of change of voltage of the source 9, and since the output of the amplifier system is applied to the lamp 11, the voltage applied to the lamp, if not further controlled in any way, would be proportional to the rate of change of the voltage of the source 9 and hence approximately proportional to the speed of movement of the mirrors 18 and 19 of the galvanometers.

If the lamp 11 emitted light in proportion to the voltage applied thereto no further control of that voltage would be necessary to cause the light from the lamp to have an intensity directly proportional to the changes in voltage of the source 9, but there are no known incandescent lamps which have this characteristic.

To cause the lamp 11 to approach the desired operation, that is, to cause it to emit more or less light in proportion to the magnitude of the rate of change, either increase or decrease, in the voltage of the source 9 and to bring about a change in the amount of light emitted as quickly as possible after the change occurs, and further to cause the amount of light emitted to be proportional to the speed of the film 10, an additional control system has been provided.

Mechanism for moving the film 10 is not shown in the drawing, and forms no part of the present invention, but mechanism is diagrammatically shown which is responsive to movement of the film 10. This is shown merely as a roller 115 on a shaft 116, which is geared to the film with a disk 117 mounted on the shaft 116 (although in actual practice a gear train may be employed to make the relative angular speeds of the disk 117 and the roller 115 other than unity). The disk 117 contains a number of uniformly spaced perforations or holes 118. This device is known as a "chopper" and serves to interrupt the passage of light from an incandescent lamp 119 to a photoelectric cell 120. A beam of light from the lamp 119 passing through one of the holes 118 to the cell 120 is illustrated in the drawing by the dash line 121. Since this beam of light passes through the holes 118, the speed of rotation of the disk 117 controls the frequency of the interruptions of the light beam 121.

One element of the photoelectric cell 120 is grounded as shown at 122. The other is connected by means of wire 123 to resistance coupling associated with the input circuit of a vacuum tube $T_1$ which functions as an alternating current amplifier. The resistance coupling is illustrated as consisting of a condenser 124, a resistance 125 connected to the positive terminal of a "B" battery 126, and a resistance 129. The condenser 124 is connected to the grid 127 of the vacuum tube $T_1$ and a small battery 128 connected to the resistance 129 puts a negative bias on the grid 127.

The cathode 130 of the tube $T_1$ is grounded as illustrated.

The plate 131 of tube $T_1$ is connected through resistance coupling to the grid 132 of the tube $T_2$. The resistance coupling is the same as that for the tube $T_1$, and consists of a condenser 133, a resistance 134 connected to the positive terminal of a "B" battery 135 and a resistance 137. A small battery 136 is connected to resistance 137 to put a negative bias on the grid 132. The cathode 138 of the tube $T_2$ is grounded and the plate 139 is resistance coupled to the control grid 140 of the tube $T_3$. As before, the resistance coupling between the tubes $T_2$ and $T_3$ includes a condenser 141, a resistance 142 connected to the positive terminal of a "B" battery 143 and a resistance 145. A small battery 144 is connected to a resistance 145 to put a negative bias on the grid 140.

The tube $T_3$ contains an auxiliary grid 140a which is connected to the cathode 146, both the grid 140a and the cathode 146 being connected through a resistance 147 and a condenser 148 to the plate 149 of the tube $T_3$. A "B" battery 150 connected directly thereto supplies the potential to the plate 149.

The tube $T_1$ functions as an ordinary alternating current amplifier. The current in the output of this tube has a frequency the same as that of the interruptions of the beam of light 121 by the perforated disk 117.

The tube $T_2$ also functions as an alternating current amplifier and the frequency of its output is the same as that of the tube $T_1$. However, this tube is overloaded and the output thereof has a wave shape which is approximately square.

The tube $T_3$ is a gas-filled tube and the output therefrom is unidirectional, there being a pulse in the plate circuit each time the disk 117 permits the flow of light from the lamp 119 to the cell 120.

The square wave output of tube $T_2$ is applied to the grid 140 of tube $T_3$ in such a manner that the grid receives a voltage pulse of short duration once each cycle, which serves to start conduction in the plate circuit of tube $T_3$. When tube $T_3$ is conducting, condenser 148 discharges through it and the current limiting resistance 147. When condenser 148 is discharged tube $T_3$ ceases to conduct until the next cycle and condenser 148 recharges. This charging current flows through the milliammeter 153 and its associated circuit. Thus the metering circuit current consists of a series of unidirectional pulses of equal energy value whose average current, as read by the milliammeter 153, depends only upon the frequency with which they occur. This frequency is proportional to the rate of rotation of the perforated disk 117. If desired, this milliammeter may be calibrated in units of speed.

To eliminate the effect of pulsations of current in the system, an electrical filter may be connected across the resistance 152 and the milliammeter 153, this filter being illustrated in the drawing as consisting of a condenser 154. The adjustable resistance 155 in parallel with resistance 152 and milliammeter 153, serves as a calibration control and may be used to compensate for the variations between tubes should it be necessary to change them.

The network which includes tubes $T_1$, $T_2$ and $T_3$ might be termed an electrical speedometer or electrical frequency meter in which the frequency is controlled by the speed of a moving object, in this case the film 10. Since the film 10 may be geared to some other object such as an electrode being moved in an oil well, or since the disk 117 may be geared to some other moving object it is obvious that the electrical system could be used to measure the speed of devices other than that illustrated in the drawing.

From what has been shown above, it will now be clear that if the lamp 11 is caused to emit light in proportion to the amount of power in the plate circuit of the vacuum tube $T_3$, it will also emit light in proportion to the speed of the film 10.

An adjustable tap 157 is provided on the resistance 152 so that the voltage drop across the portion of the resistance 152 between the tap 157 and the ground is taken off. By means of wire 159, this tap 157 is connected through a number of resistances 160, 161 and 162 connected in series to the midpoint of the resistances 77 and 76 of the differentiating network connected to tubes $T_6$ and $T_7$.

In the circuit illustrated, the potential of the wire 159 with respect to the ground depends upon voltage drops across these resistances. A battery 163 in circuit with a variable resistance 164 is connected across resistance 161 and a battery 165 in circuit with a photoelectric cell 166 is connected across the variable resistance 162. The A. C. source 78 mentioned above is in series with a variable resistance 168 and connected across resistance 160. With such a circuit, there is a voltage drop across each of the resistances 152, 160, 161 and 162. The algebraic sum of the D. C. voltage drops across resistances 152, 161 and 162 (due to the output of the tube $T_3$ and to the batteries 163 and 165 respectively) may be said to modulate the A. C. voltage drop across resistance 160 due to the source 78, all of these resistances being connected to the wire 159.

The amount of A. C. amplification in either tube $T_6$ or $T_7$ is a function of the D. C. potential or bias on its grid. The D. C. voltage drop across resistance 152 due to the output of tube $T_3$ is one component of this grid potential or bias. Therefore, variations in voltage of the output of tube $T_3$ affect the output of tubes $T_6$ or $T_7$ (depending on which one is functioning, it being understood that these tubes function alternately as the voltage of the source 9 goes up and down, or simply in parallel when no change in voltage of the source 9 is occurring).

Consequently, the energy supplied to lamp 11 is affected by variations in voltage of the output of tube $T_3$ and accordingly by the speed of the film 10. The output of tube $T_3$ must be so connected as to polarity that an increase in voltage drop across resistance 152 causes an increase in output of the tubes $T_6$ or $T_7$.

By means of variable resistance 164 the voltage drop due to the battery 163 is adjusted to introduce an additional bias voltage into wire 159. This additional bias serves to adjust the light output of lamp 11 to zero when the voltage drop across resistance 152 is zero.

By means of the variable resistance 168, the A. C. voltage from the source 78 across resistance 160 should be made of such magnitude that the lamp 11 will have the maximum desired light output when the grid bias of tubes $T_6$ or $T_7$ is such that the amplification is a maximum. The frequency of source 78 should be high enough that the amplifier may be designed to amplify it without also amplifying the variations in voltage across resistance 152 or the other variation in D. C. components impressed upon the grids of tubes $T_6$ and $T_7$. For example, the frequency of source 78 may be 1,500 cycles per second where the maximum rate of change in the voltage of the source 9 is less than that of a corresponding A. C. voltage of several cycles per second.

By means of variable resistances 162 an adjustment can be made when lamp 11 is giving off light, which will vary the amount of light given off to bring about a predetermined relation between the light output and a given voltage grid bias on the tubes $T_6$ and $T_7$. As shown hereinafter, this relation, when once obtained for a given bias is automatically maintained by the circuit which includes the cell 166 without further adjustment.

The photoelectric cell 166 referred to above is placed adjacent the incandescent lamp 11 so as to be illuminated by a beam of light therefrom. In the drawing this is indicated by the dash line 14 passing through an aperture 17.

During operation, there are only three factors which vary or control the amount of energy supplied to the lamp 11 through the amplifier network, these being the rate of change in D. C. voltage of the source 9, as already described, the direct current voltage drop across resistance 152 depending upon the speed of film 10, and the voltage drop across resistance 162 dependent on the current flow through the photoelectric cell 166 (the resistances 164 and 168 not being adjusted during operation and the voltages of the sources 78, 163 and 165 remaining constant).

The photoelectric cell 166 and the associated battery 165 and resistance 162 may be said to constitute a photoelectric negative feed-back circuit from the lamp 11 to the amplifier network. This feed-back circuit causes the amount of light given off to be proportional to the grid bias on tubes $T_6$ or $T_7$.

The amount of light given off by an incandescent lamp does not vary in proportion to the amount of current flowing through the filament. An increase in voltage above that for which the lamp was designed will not cause a proportionate increase in light emission. Moreover, there is a time lag between a change in voltage and a change in light emission.

Of course, the movable elements of the galvanometers do not respond to a change in voltage instantaneously, but the inertia of these elements is made as small as possible to improve the accuracy of the records and the galvanometers respond to a change much quicker than an incandescent lamp does. Experience has shown that in the absence of a photoelectric feed-back circuit, or some other means to compensate for the speed with which a light beam reflected from a mirror of a galvanometer traverses a film, the beam may move considerable distance on its path or even the entire extent of its deflection before any noticeable change in the light intensity of the lamp takes place.

The photoelectric feed-back arrangement herein described makes the intensity of light given off by the lamp approximately proportional to the bias on the tubes $T_6$ or $T_7$ (whether that bias be proportional to the rate of change of the voltage of source 9 or whether it is proportional to the speed of film 10 or whatever may create the bias) and it also causes the amount of light emitted to change promptly following a change in the amount of bias.

These functions are accomplished by causing the voltage drop across the resistance 162 to be proportional to the intensity of the light striking the cell from the lamp 11. Since the current flow of the cell 166 varies in proportion to the light intensity therein, the voltage drop across the resistance 162 varies in proportion to the intensity of the light given off by the lamp 11.

The voltage drop across resistance 162 must be selected to have the proper value to be an effective part of the potential on wire 159. In addition, the arrangement must be such that the voltage across resistance 162 is introduced into the wire 159 in opposition to the voltage drop across resistance 152. For purpose of explanation, if it be assumed that no variations in source 9 are taking place, it will be seen that the difference between the voltages across resistances 152 and 162 then controls the amount of energy supplied to the lamp 11. If this difference is made small, i. e., if the voltage drop across the resistance 162 is made approximately equal to the voltage drop across resistance 152, then the light output will be approximately proportional to the voltage drop across resistance 152. But the voltage drop across the resistance 162 cannot be made identical with the voltage drop across resistance 152, because if that condition always prevailed there would be no change in input to the tubes $T_6$ or $T_7$. However, the amplifying network can be so designed as to have high amplification, so that the difference in these voltages required to obtain any desired light output from the lamp 11 will be very small.

Likewise the D. C. voltage resulting from the changes in the source 9 must be impressed on the grids of tubes $T_6$ and $T_7$ in opposition to the bias placed on these grids by the voltage drop across resistance 162 and the difference between these opposing voltages should also be made small.

It is because the voltage drop across resistance 162 is opposed to both of the other biasing voltages that the photoelectric circuit is referred to above as a negative feed-back circuit.

In other words, there being three variables (the voltage of source 9, the speed of the film 10 and the light emission of lamp 11) which affect the amount of amplification of the amplifier network, the accuracy of the response to change in any one variable is improved if the difference between the sum of the variables and the negative feed-back voltage is small.

In this connection, it should be noted that if the film 10 were run at a constant speed, one of these variables would disappear. An important sub-combination of the present invention involves the use of a photoelectric feed-back circuit with a recorder for a variable voltage as shown, without the electrical speedometer being included.

The feed-back circuit reduces the tendency of changes in the light output from lamp 11 to lag behind changes in bias on the grids of tubes $T_6$ and $T_7$. If the bias on tube $T_7$ increases suddenly in response to an increase in voltage of source 9, there will be no corresponding increase in negative feed-back voltage from the photoelectric cell until the light output increases. Under these conditions the difference between the regular bias caused by the rate of change in voltage of source 9 and the negative feed-back bias from the cell will be very large, with the result that very high energy is supplied to the lamp. As the light output increases, the feed-back voltage also increases and reduces the energy supplied to the lamp to the proper value. Similarly, the energy supplied to the lamp increases rapidly when the regular bias on the grid of tube $T_6$ increases suddenly in response to a decrease in voltage of the source 9.

It will be apparent that the system of the present invention is not dependent upon the exact relation of current to light intensity of the lamp 11 nor upon any other characteristics of the lamp 11. The photoelectric feed-back circuit is such that the characteristics of the lamp are not controlling of the amount of energy fed back. The amount of light emitted is the controlling factor.

Since there are a number of photoelectric cells on the market, and since some have been designed to be sensitive to particular light waves, care should be exercised in selecting the cell. The cell should be sensitive to the same range of the spectrum as that to which the film is sensitive, if the best results are to be obtained with that film.

As explained above, the "on scale" and "off scale" galvanometers 20 and 21 may not have the same sensitivity. Consequently the beams of light 12 and 13 do not move across the film at the same speed. If, for example, the galvanometer 20 has one-tenth the sensitivity of the galvanometer 21 the light beam 13 will move only one-tenth as fast as the light beam 12 for the same unit change in voltage of the source 9. It is advisable, therefore, to control the light emission from the lamp 11 to reduce its intensity when the beam from the "off scale" galvanometer 20 comes onto the film. An automatic sensitivity control for accomplishing this is shown in the drawing as consisting of a simple voltage divider. This consists of the tube $T_{10}$ together with the resistance 170 and battery 173. It will be seen that the resistance 170 is connected to the grid 41 of tube $T_5$. Therefore, it regulates only the effect of the source 9 upon the amplifier network. The plate 171 of the tube $T_{10}$ is connected to the resistance 170 while the cathode 172 is connected to a "B" battery 173 which is grounded. The tube $T_{10}$ acts as an electronic switch to shunt some of the current flow from the "B" battery 38 when the output of the tube $T_4$ reaches a predetermined amount, namely an amount sufficient that the effective grid voltage from battery 38 exceeds that of battery 173, in the circuits which include these batteries. The constants of the network may be so selected that the tube $T_{10}$ functions to close this circuit at the same instant that the galvanometer voltage causes the beam of light 12 to leave the film 10 and the beam of light 13 to move onto the film 10. Thus the amount of energy supplied to the lamp 11 may automatically be made sufficiently less when the beam of light 13 is on the film than it is when the beam of light 12 is on the film 10 to compensate for the difference in velocity of movement of the light beams 12 and 13.

It is to be understood that in practice all D. C. voltages necessary for the operation of the various circuits may be derived from a common power supply. The required circuit changes, stabilizing networks and decoupling networks necessary to permit this are known to those skilled in the art and need not be described here.

It is obvious that various other changes may be made without departing from the spirit of the invention or the scope of the annexed claims.

I claim:

1. An electrical control system comprising a thermionic amplifier network, a direct current source having a variable voltage connected to the input circuit of said network, an incandescent lamp connected to the output of said network and an arrangement for causing said lamp to emit light approximately in proportion to the rate of change in voltage, either increase or decrease, of said source, said arrangement including control means for impressing a variable bias on said network proportional to the rate of change of the voltage of said source thereby regulating the amplification of said network, a photoelectric cell so disposed as to be illuminated by said lamp so that the resistance thereof varies with the amount of light given off by said lamp and means associated with said cell and said network for modifying the variable bias impressed upon said network by said control means in accordance with the resistance of said cell.

2. An electrical system comprising a thermionic amplifier network, a source of direct current having a variable voltage connected to the input thereof, a recording meter connected to said source independently of said network to respond to the variations in voltage of said source, said meter having movable optical means for directing a beam of light on a photosensitive surface and for moving the beam as a function of the voltage of said source, an incandescent lamp connected to the output of said network and so disposed with respect to said meter as to direct the beam of light on the optical means thereof, and an arrangement for causing said lamp to emit light approximately in proportion to the rate of change in the voltage of said source thereby causing the intensity of the light given off by said lamp to be approximately proportional to the speed of the beam of light directed onto the photosensitive surface, said arrangement including control means for impressing a variable regulating bias on said network proportional to the rate of change of voltage of said source.

3. An electrical system comprising a thermionic amplifier network, a source of direct current having a variable voltage connected to the input thereof, a recording meter connected to said source independently of said network to respond to the variations in voltage of said source, said meter having optical movable means for directing a beam of light on a photosensitive surface and for moving the beam as a function of the voltage of said source, an incandescent lamp connected to the output of said network and so disposed with respect to said meter as to direct the beam of light on the optical means thereof, and an arrangement for causing said lamp to emit light approximately in proportion to the rate of change in the voltage of said source thereby causing the intensity of the light given off by said lamp to be approximately proportional to the speed of the beam of light directed onto the photosensitive surface, said arrangement including control means for impressing a variable regulating bias on said network proportional to the rate of change of voltage of said source, and a photoelectric feedback circuit for modifying the variable regulating bias impressed on said network in accordance with the light output of said lamp.

4. An electrical system comprising a source of direct current having a variable voltage, a meter connected to said source and responsive to the variations in voltage thereof, a recorder associated with said meter having means for moving photosensitive material with respect to said meter and optical means for directing a beam of light from said meter onto said material and for moving the beam as a function of the voltage of said source to make a record of the variations in voltage of said source, a lamp providing a source of light for said optical means and an arrangement for causing said lamp to emit light substantially in proportion to the relative speed between said photosensitive material and the beam of light directed thereon by said optical means, said arrangement including a thermionic amplifier network for supplying energy to said lamp and means for impressing a variable regulating bias on said network proportional to the rate of change of voltage of said source.

5. An electrical system comprising a source of direct current having a variable voltage, a meter connected to said source and responsive to the variations in voltage thereof, a recorder associated with said meter having means for moving photosensitive material with respect to said meter and optical means for directing a beam of light from said meter onto said material and for moving the beam as a function of the voltage of said source to make a record of the variations in voltage of said source, a lamp providing a source of light for said optical means and an arrangement for causing said lamp to emit light substantially in proportion to the relative speed between said photosensitive material and the beam of light directed thereon by said optical means, said arrangement including a thermionic amplifier network for supplying energy to said lamp, means for impressing a variable regulating bias on said network proportional to the rate of change of voltage of said source, and a photoelectric feedback circuit for modifying the variable regulating bias impressed on said network in accordance with the light output of said lamp.

6. An electrical system comprising a source of direct current having a variable voltage, a meter connected to said source and responsive to the variations in voltage thereof, a recorder associated with said meter having means for moving photosensitive material with respect to said meter and optical means for directing a beam of light from said meter onto said material and for moving the beam as a function of the voltage of said source to make a record of the variations in voltage of said source, a lamp providing a source of light for said optical means and an arrangement for causing said lamp to emit light substantially in proportion to the relative speed between said photosensitive material and the beam of light directed thereon by said optical means, said arrangement including a thermionic amplifier network for supplying energy to said lamp, means for impressing a variable regulating bias on said network proportional to the rate of change of voltage of said source, and means for further modifying the variable regulating bias impressed on said network in accordance with the speed of said photosensitive material through said recorder.

7. An electrical system comprising a source of direct current having a variable voltage, a meter connected to said source and responsive to the variations in voltage thereof, a recorder associated with said meter having means for moving photosensitive material with respect to said meter and optical means for directing a beam of light from said meter onto said material and for moving the beam as a function of the voltage of said source to make a record of the variations in voltage of said source, a lamp providing a source of light for said optical means and an arrangement for causing said lamp to emit light substantially in proportion to the relative speed between said photosensitive material and the beam of light directed thereon by said optical means, said arrangement including a thermionic amplifier network for supplying energy to said lamp, means for impressing a variable regulating bias on said network proportional to the rate of change of voltage of said source, a photoelectric feed-back circuit for modifying the variable regulating bias impressed on said network in accordance with the light output of said lamp and means for further modifying the variable regulating bias impressed on said network in accordance with the speed of said photosensitive material through said recorder.

8. An electrical system comprising a source of direct current having a variable voltage, two meters connected to said source, said meters having different sensitivity but both being responsive to variations in the voltage of said source, a recorder associated with said meters having means for moving photosensitive material with respect to said meters and optical means for each meter for directing a beam of light from each toward said material and so arranged that each beam moves over the material as a function of the voltage of said source, the optical means for each meter being so disposed relatively that the beams of light strike said material alternately, one being an on-scale beam and the other an off-scale beam, a single lamp providing a source of light for the optical means of both of said meters and an arrangement for causing said lamp to emit light substantially in proportion to the relative speed between said photosensitive material and either of the beams of light directed thereon by said optical means, said arrangement including a thermionic amplifier network for supplying energy to said lamp, means for impressing a variable regulating bias on said network proportional to the rate of change of voltage of said source and means for modifying the variable regulating bias automatically when the off-scale beam moves onto said material and the on-scale beam moves off thereof.

9. An electrical system comprising a source of direct current having a variable voltage, two meters connected to said source, said meters having different sensitivity but both being responsive to variations in the voltage of said source, a recorder associated with said meters having means for moving photosensitive material with respect to said meters and optical means for each meter for directing a beam of light from each toward said material and for moving each of said beams as a function of the voltage of said source, the optical means for each meter being so disposed relatively that the beams of light strike said material alternately, one being an on-scale beam and the other an off-scale beam, a single lamp providing a source of light for the optical means of both of said meters and an arrangement for causing said lamp to emit light substantially in proportion to the relative speed between said photosensitive material and either of the beams of light directed thereon by said optical means, said arrangement including a thermionic amplifier network for supplying energy to said lamp, means for impressing a variable regulating bias on said network proportional to the rate of change of voltage of said source, means for modifying the variable regulating bias automatically when the off-scale beam moves onto said material and the on-scale beam moves off thereof, and a photoelectric feed-back circuit for modifying the variable regulating bias impressed on said network in accordance with the light output of said lamp.

10. An electrical system comprising a source of direct current having a variable voltage, two meters connected to said source, said meters having different sensitivity but both being responsive to variations in the voltage of said source, a recorder associated with said meters having means for moving photosensitive material with respect to said meters and optical means for each meter for directing a beam of light from each toward said material and for moving each of said beams as a function of the voltage of said source, the optical means for each meter being so disposed relatively that the beams of light strike said material alternately, one being an on-scale beam and the other an off-scale beam, a single lamp providing a source of light for the optical means of both of said meters and an arrangement for causing said lamp to emit light substantially in proportion to the relative speed between said photosensitive material and either of the beams of light directed thereon by said optical means, said arrangement including a thermionic amplifier network for supplying energy to said lamp, means for impressing a variable regulating bias on said network proportional to the rate of change of voltage of said source, means for modifying the variable regulating bias automatically when the off-scale beam moves onto said material and the on-scale beam moves off thereof and means for further modifying the variable regulating bias impressed on said network in accordance with the speed of said photosensitive material through said recorder.

11. An electrical system comprising a source of direct current having a variable voltage, two meters connected to said source, said meters having a different sensitivity but both being responsive to variations in the voltage of said source, a recorder associated with said meters having means for moving photosensitive material with respect to said meters and optical means for each meter for directing a beam of light from each toward said material and for moving each of said beams as a function of the voltage of said source, the optical means for each meter being so disposed relatively that the beams of light strike said material alternately, one being an on-scale beam and the other an off-scale beam, a single lamp providing a source of light for the optical means of both of said meters and an arrangement for causing said lamp to emit light substantially in proportion to the relative speed between said photosensitive material and either of the beams of light directed thereon by said optical means, said arrangement including a thermionic amplifier network for supplying energy to said lamp, means for impressing a variable regulating bias on said network proportional to the rate of change of voltage of said source, means for modifying the variable regulating bias automatically when the off-scale beam moves onto said material and the on-scale beam moves off thereof, a photoelectric feed-back circuit for modifying the variable regulating bias impressed on said network in accordance with the light output of said lamp and means for further modifying the variable regulating bias impressed on said network in accordance with the speed of said photosensitive material through said recorder.

NORMAN A. HASSLER.

REFERENCES CITED

The following references are of record in the file of this patent:

FOREIGN PATENTS

| Number | Country | Date |
| --- | --- | --- |
| 394,328 | British | June 16, 1933 |
| 161,988 | British | Jan. 5, 1922 |